United States Patent
Bailey et al.

(10) Patent No.: US 8,554,974 B2
(45) Date of Patent: Oct. 8, 2013

(54) EXPANDING FUNCTIONALITY OF ONE OR MORE HARD DRIVE BAYS IN A COMPUTING SYSTEM

(75) Inventors: Warren D. Bailey, Durham, NC (US); James E. Hughes, Durham, NC (US); Thomas D. Pahel, Jr., Durham, NC (US); Pravin S. Patel, Durham, NC (US); Challis L. Purrington, Durham, NC (US); Jack P. Wong, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 12/788,541

(22) Filed: May 27, 2010

(65) Prior Publication Data

US 2011/0292591 A1    Dec. 1, 2011

(51) Int. Cl.
*G06F 13/14*    (2006.01)

(52) U.S. Cl.
USPC .......................................... 710/305; 710/315

(58) Field of Classification Search
USPC .......................................... 710/305–307, 315
See application file for complete search history.

(56) References Cited

U.S. PATENT DOCUMENTS

| | | | |
|---|---|---|---|
| 6,400,730 B1 | 6/2002 | Latif et al. | |
| 7,133,416 B1 | 11/2006 | Chamdani et al. | |
| 7,245,632 B2 | 7/2007 | Heffernan et al. | |
| 7,376,789 B2 | 5/2008 | Halleck et al. | |
| 7,487,283 B2 * | 2/2009 | Sivertsen | 710/306 |
| 7,580,637 B2 | 8/2009 | El-Ahmadi et al. | |
| 8,032,785 B1 * | 10/2011 | Brown et al. | 714/6.32 |
| 8,074,011 B2 * | 12/2011 | Flynn et al. | 711/103 |
| 2007/0076757 A1 | 4/2007 | Dodd et al. | |
| 2008/0288685 A1 | 11/2008 | Dalton et al. | |
| 2009/0251867 A1 | 10/2009 | Sharma et al. | |

OTHER PUBLICATIONS

Nishi, Y et al. "An ASIC-ready 1.25-6.25 Gb/s SerDes in 90 nm CMOS with multi-standard compatibility", presented at the 2008 IEEE Asian Solid-State Circuits Conference, on Nov. 3-5, 2008 in Fukuoka, Japan, pp. 37-40.

Leigh, Kevin Degree: Ph.D. Paper, "Design and analysis of IO consolidation, in a general-purpose infrastructure for blade servers", Year: 2007 Corporate Source/Institution: University of Houston (0087) Adviser: Jaspal Subhlok Source: vol. 6902B of Dissertations Abstracts International. p. 1210. 260 Pages.

Toshiba; Product Brief "Multi-Protocol, High Speed Serdes I/O Core"; Copyright Apr. 2008 TAEC.

* cited by examiner

*Primary Examiner* — Clifford Knoll

(74) *Attorney, Agent, or Firm* — H. Barrett Spraggins; Cynthia G. Seal; Biggers & Ohanian, LLP.

(57) ABSTRACT

Methods, apparatus, and product are disclosed for expanding functionality of hard drive bays in a computing system that include: providing, by a connector in a hard drive bay, access to two or more data communication busses of different type; receiving, by the connector of the hard drive bay, a device mounted within the hard drive bay; and communicately coupling, by the connector of the hard drive bay, the device to one of the data communication busses.

15 Claims, 5 Drawing Sheets

EXPANDING FUNCTIONALITY OF ONE OR MORE HARD DRIVE BAYS IN A COMPUTING SYSTEM

BACKGROUND OF THE INVENTION

1. Field of the Invention

The field of the invention is data processing, or, more specifically, methods, apparatus, and products for expanding functionality of one or more hard drive bays in a computing system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Current computing systems may be comprised of blade servers mounted within a blade center. In order to expand the functionality of such a computing system, it is often necessary to add a sidecar to the computing system or otherwise modify the blade server chassis. Adding a sidecar to the computing system or otherwise modifying the blade server chassis may be labor intensive, cost prohibitive, or otherwise disadvantageous.

SUMMARY OF THE INVENTION

Methods, apparatus, and products are disclosed for expanding functionality of one or more hard drive bays in a computing system that include providing, by a connector in a hard drive bay, access to two or more data communication busses of different type; receiving, by the connector of the hard drive bay, a device mounted within the hard drive bay; and communicately coupling, by the connector of the hard drive bay, the device to one of the data communication busses.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
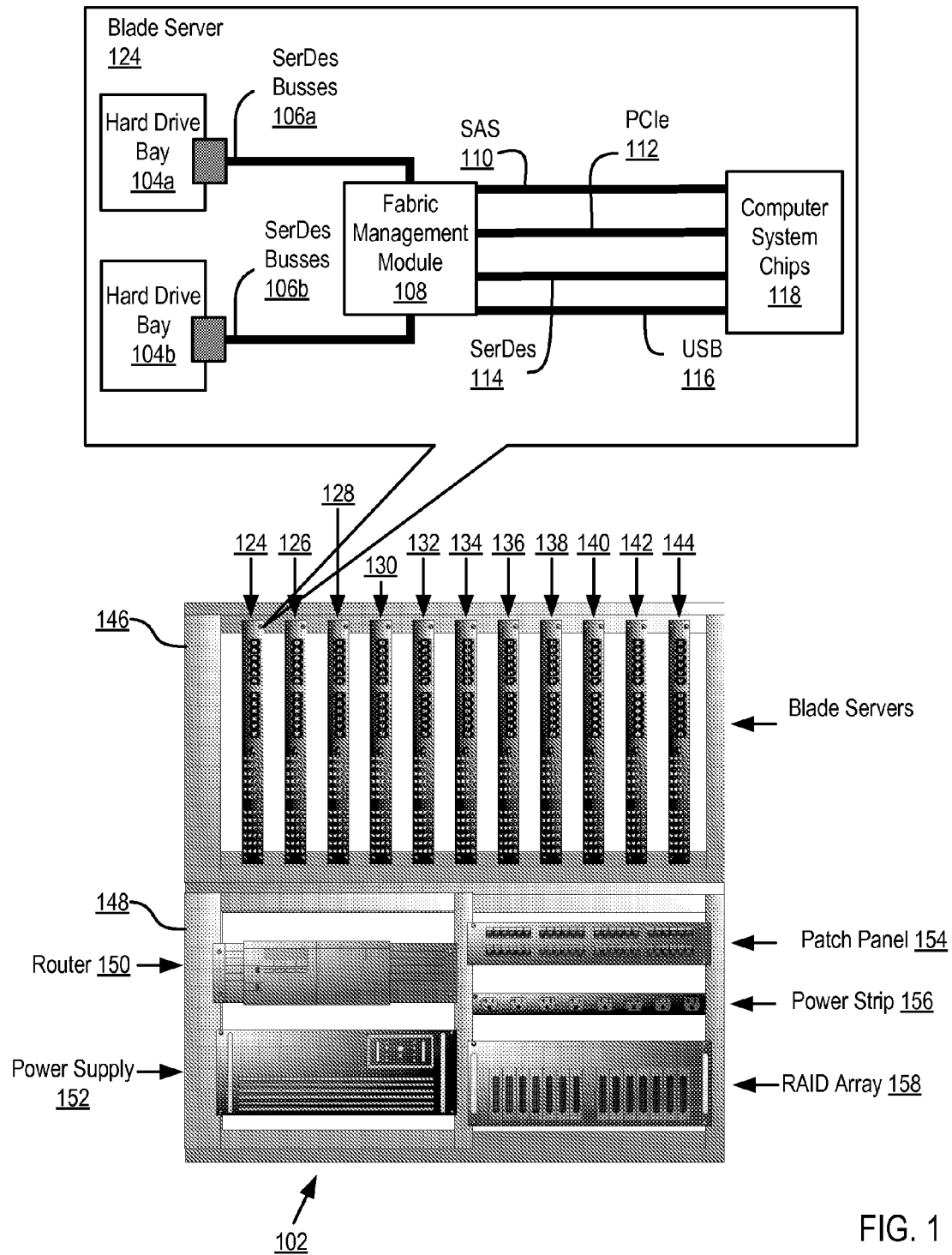
FIG. 1 sets forth a front view of a computing system in which the functionality of one or more hard drive bays is expanded according to embodiments of the present invention.

Exemplary methods, apparatus, and products for expanding functionality of one or more hard drive bays in a computing system in accordance with the present invention are described with reference to the accompanying drawings, beginning with FIG. 1. FIG. 1 sets forth a front view of a computing system (102) in which the functionality of one or more hard drive bays (104a, 104b) is expanded according to embodiments of the present invention. The computing system (102) of FIG. 1 includes a data communications network router (150), a patch panel (154), a Redundant Array of Independent Disks ('RAID') (158), and a power strip (158).

The computing system (102) of FIG. 1 also includes eleven blade servers (124, 126, 128, 130, 132, 134, 136, 138, 140, 142, 144), each of which is powered by a power supply (152). In the example of FIG. 1, each blade server (124, 126, 128, 130, 132, 134, 136, 138, 140, 142, 144) includes hard drive bays (104a, 104b). The hard drive bays (104a, 104b) are housings configured to receive computer storage devices such as, for example, a hard drive, optical drive, or solid state drive. Examples of computer storage devices that may be mounted within the hard drive bays (104a, 104b) include a Serial Attached SCSI ('SAS') hard drive, a Serial ATA ('SATA') hard drive, and so on. In the example of FIG. 1, the functionality of each hard drive bay (104a, 104b) is expanded such that the hard drive bays (104a, 104b) may be configured to receive computing devices other than computer storage devices as described in greater detail below with reference to FIG. 2.

In the computing system (102) of FIG. 1, the hard drive bays (104a, 104b) in each blade server (124, 126, 128, 130, 132, 134, 136, 138, 140, 142, 144) are coupled to SerDes busses (106a, 106b). A SerDes bus (106a, 106b) is a data communications link configured to enable data communications between a device that utilizes serial communications and a device that utilizes parallel communications. A SerDes bus (106a, 106b) may facilitate data communications between a device that utilizes serial communications and a device that utilizes parallel communications, for example, with a Parallel In Serial Out ('PISO') block that converts parallel communications into serial communications and a Serial In Parallel Out ('SIPO') block that converts serial communications to parallel communications. Although the SerDes busses (106a, 106b) of FIG. 1 are configured to enable data communications between a device that utilizes serial communications and a device that utilizes parallel communications, SerDes busses (106a, 106b) may also be used for data communications between two devices that utilize serial communications or two devices that utilize parallel communications. The hard drive bays (104a, 104b) of FIG. 1 may be coupled to SerDes busses (106a, 106b), for example, using a standard SAS connector such as an SFF-8482 connector, an SF-8484 connector, or an SF-8485 connector.

In the computing system (102) of FIG. 1, each blade server (124, 126, 128, 130, 132, 134, 136, 138, 140, 142, 144) includes a fabric management module (108). The fabric management module (108) of FIG. 1 is configured to detect that a new device has been added to a hard drive bay (104a, 104b) of a blade server (124, 126, 128, 130, 132, 134, 136, 138, 140, 142, 144) in the computing system (102). The fabric management module (108) of FIG. 1 is also configured to identify a data communications protocol that is used by the new device, to select a fabric that supports the data communications protocol that is used by the new device, and to route data communications according to the data communications protocol that is used by the new device across the selected fabric, as described in greater detail below with reference to FIG. 2.

In the computing system (102) of FIG. 1, each blade server (124, 126, 128, 130, 132, 134, 136, 138, 140, 142, 144) includes computer system chips (118). In the example of FIG. 1, the computer system chips (118) are useful in connecting storage devices and other network devices to a host system. The computer system chips (118) may be embodied, for example, as a host controller, host adapter, or other host bus adapter useful in connecting storage devices and other network devices to a host system. In the example of FIG. 1, the computer system chips (118) are used to connect a SAS bus (110), a PCIe bus (112), a SerDes bus (114), and a USB bus (116) to the host system. These respective busses are used for data communications between the computer system chips (118) and devices mounted in the hard drive bays (104a, 104b) via the SerDes busses (106a, 106b) and the fabric management module (108) as described below with reference to FIG. 2.

The arrangement of components in the example system of FIG. 1, the power supply, RAID array, servers, and other devices making up the exemplary system illustrated in FIG. 1, are for explanation, not for limitation. Computing systems (102) in which the functionality of one or more hard drive bays (104a, 104b) is expanded according to embodiments of the present invention may be also be embodied as a single stand alone computer, as a collection of networked computing devices, and in other ways as will occur to those of skill in the art.

Figure 2:
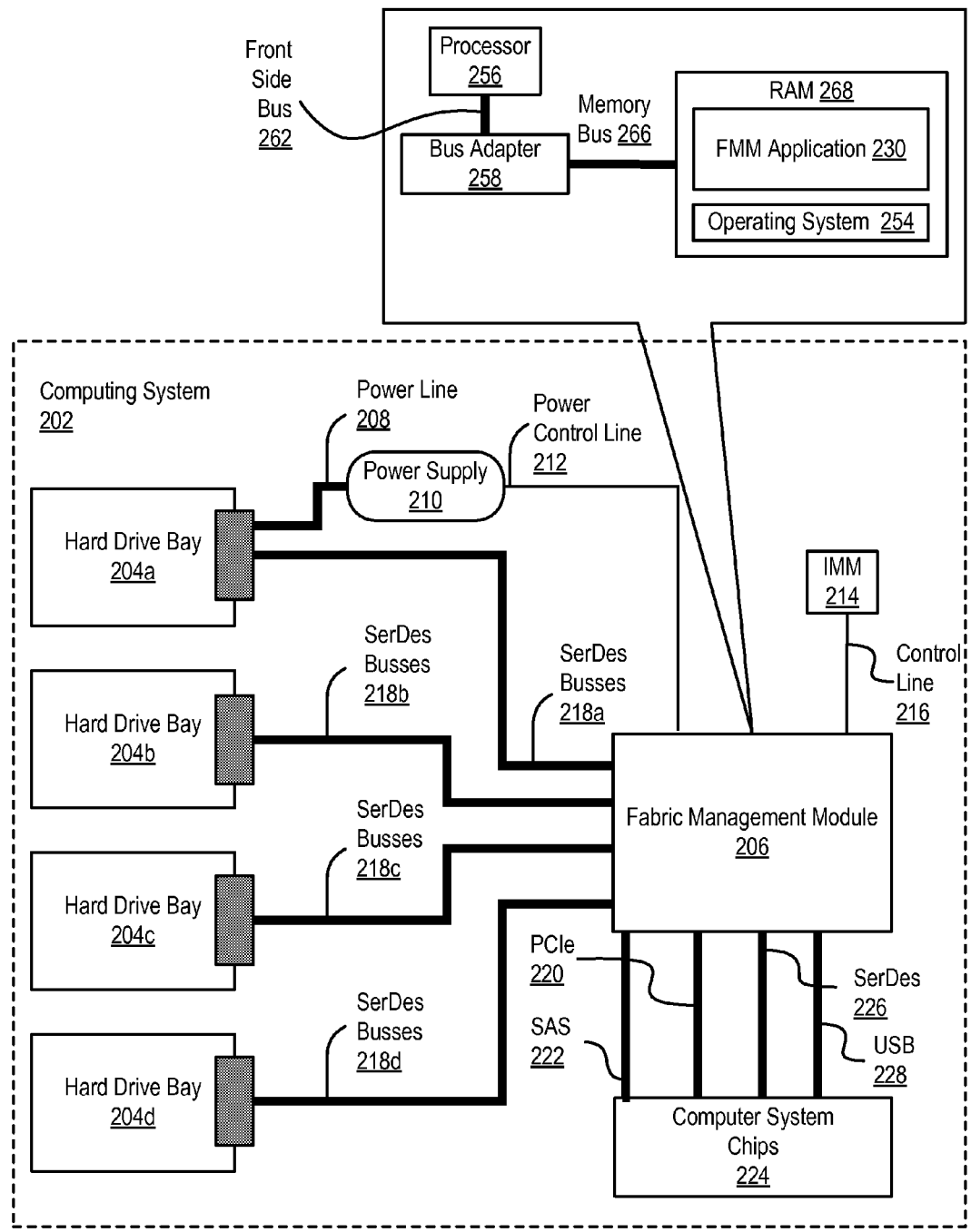
FIG. 2 sets forth a block diagram of automated computing machinery comprising an exemplary computing system useful in expanding functionality of one or more hard drive bays in the computing system according to embodiments of the present invention.

Expanding functionality of one or more hard drive bays in a computing system in accordance with the present invention is generally implemented with computers, that is, with automated computing machinery. In the system of FIG. 1, for example, the blade servers (124, 126, 128, 130, 132, 134, 136, 138, 140, 142, 144) are implemented to some extent at least as computers. For further explanation, therefore, FIG. 2 sets forth a block diagram of automated computing machinery comprising an exemplary computing system (202) useful in expanding functionality of one or more hard drive bays (204a, 204b, 204c, 204d) in the computing system (202) according to embodiments of the present invention. In the example of FIG. 2, the hard drive bays (204a, 204b, 204c, 204d) are hot swappable in the sense that devices may be removed from or added to the hard drive bays (204a, 204b, 204c, 204d) without requiring a system reboot in order for the devices in the hard drive bays (204a, 204b, 204c, 204d) to be operable. The hard drive bays (204a, 204b, 204c, 204d) are housings configured to receive computer storage devices such as, for example, a hard drive, optical drive, or solid state drive. Examples of computer storage devices that may be mounted within the hard drive bays (204a, 204b, 204c, 204d) include a SAS hard drive, a SATA hard drive, and so on. In the example of FIG. 2, the hard drive bays (204a, 204b, 204c, 204d) may further be configured to receive computing devices other than computer storage devices as described in greater detail below.

The computing system (202) of FIG. 2 also includes a power supply (210). The power supply (210) of FIG. 2 is an electric device that can deliver electrical energy to a hard drive bay (204a) over a power line (208). The power supply (210) of FIG. 2 may be embodied, for example, as a switch-mode power supply. The power supply (210) may be controlled using a power control signal line (212) utilized to control the operation of the power supply (210) by transmitting signals indicating, for example, whether the power supply (210) is to be turned off, turned on, and the output voltage to supply to the hard drive bay (204a). Although only a single power supply (210) is depicted in FIG. 2, additional power supplies may be included to provide power to the hard drive bays (204a, 204b, 204c, 204d). Alternatively, the depicted power supply (210) may be used to deliver power to the other hard drive bays (204b, 204c, 204d).

In the computing system (202) of FIG. 2, the hard drive bays (204a, 204b, 204c, 204d) are coupled to SerDes busses (218a, 218b, 218c, 218d). The hard drive bays (204a, 204b, 204c, 204d) of FIG. 2 may be coupled to SerDes busses (218a, 218b, 218c, 218d), for example, using a standard SAS connector such as an SFF-8482 connector, an SF-8484 connector, an SF-8485 connector, or other connectors as will occur to those of skill in the art. Such SAS connectors may have provisions for two or more busses. That is, two or more busses may connect to a single SAS connector. Because two or more busses may connect to a single connector, the computing system (202) of FIG. 2 may therefore include multiple SerDes busses (218a) routed to a first hard drive bay (204a), multiple SerDes busses (218b) routed to a second hard drive bay (204b), multiple SerDes busses (218c) routed to a third hard drive bay (204c), multiple SerDes busses (218d) routed to a fourth hard drive bay (204d), and so on. In such an example, a first SerDes bus that is routed to a particular hard drive bay can be coupled to the provisions in the connector for receiving a first bus, and a second SerDes bus that is routed to the same hard drive bay can be coupled to provisions in the connector for receiving a second bus. Because the SerDes busses (218a, 218b, 218c, 218d) provide the necessary physical interconnect, for example, to support a SAS bus and a PCIe bus, a first SerDes bus coupled to a particular hard drive bay may operate as a SAS bus and the second SerDes bus coupled to the same hard drive bay may operate as a PCIe bus, thereby enabling the hard drive bays (204a, 204b, 204c, 204d) to effectively house a SAS compatible device or a PCIe compatible device as each type of device will make use of the appropriate SerDes bus. Although the hard drive bays (204a, 204b, 204c, 204d) in the example of FIG. 2 are described as including provisions for receiving two busses, readers will understand that the hard drive bays (204a, 204b, 204c, 204d) may include provisions for receiving additional busses.

The computing system (202) of FIG. 2 also includes a fabric management module (206). In the example of FIG. 2, the fabric management module (206) includes at least one computer processor (256) or 'CPU' as well as random access memory (268) ('RAM') which is connected through a high speed memory bus (266) and a bus adapter (258) to the processor (256) and to other components of the fabric management module (206). Stored in RAM (268) is an operating system (254). Operating systems useful expanding functionality of the one or more hard drive bays (204a, 204b, 204c, 204d) in the computing system (202) according to embodiments of the present invention include UNIX™, Linux™, Microsoft XP™, AIX™, IBM's i5/OS™, and others as will occur to those of skill in the art. Also stored in RAM (268) is a fabric management module application (230), a module of computer program instructions for expanding functionality of the one or more hard drive bays (204a, 204b, 204c, 204d) in the computing system (202) according to embodiments of the present invention. The operating system (254) and the fabric management module application (230) in the example of FIG.

2 are shown in RAM (268), but many components of such software typically are stored in non-volatile memory also, such as, for example, on a disk drive.

The fabric management module (206) of FIG. 2 may be configured to detect that a new device has been added to a hard drive bay (204a, 204b, 204c, 204d) in the computing system (202). The fabric management module (206) of FIG. 2 can detect that a new device has been added to a hard drive bay (204a, 204b, 204c, 204d), for example, by receiving a discovery signal or other signal from the device or from the hard drive bay (204a, 204b, 204c, 204d) itself indicating that a device has been connected to a connector in the hard drive bay (204a, 204b, 204c, 204d).

The fabric management module (206) of FIG. 2 may be further configured to identify a data communications protocol that is used by the new device inserted in the hard drive bay (204a, 204b, 204c, 204d). The fabric management module (206) of FIG. 2 can identify a data communications protocol that is used by the new device, for example, through the use of virtual product data describing the new device that has been added to the hard drive bay (204a, 204b, 204c, 204d). Virtual product data is data that describes a particular device. Such virtual product data may include, for example, an identification of the device's manufacturer, a model number for the device, a serial number associated with the device, an identification of data communications protocols that the device may utilize, and so on. In an embodiment where the virtual product data includes an identification of a data communications protocol that the device may utilize, this information can be extracted from the virtual product data to identify a data communications protocol that is used by the new device inserted in the hard drive bay (204a, 204b, 204c, 204d). In other embodiments, the virtual product data may be used to construct a query that is passed to a search engine such that the data communications protocol may be identified based on the results of such a query. In yet further embodiments, the virtual product data may be used to search a virtual product data table. Such a virtual product data table may associate virtual product data for various devices with data communications protocols that are used by each device. Table 1 illustrates an example of a virtual product data table:

TABLE 1

Virtual Product Data Table

| Device Serial Number | Supported Protocol |
|---|---|
| 183420892 | USB |
| A730U898213 | PCIe |
| 4862d81 | SAS |
| Egt1578uj | SATA |
| Rt885312 | PCIe |

In the example of Table 1, the device identified by serial numbers '183420892' is a Universal Serial Bus ('USB') compatible device. In this example, the devices identified by serial numbers 'A730U898213' and 'Rt885312' are Peripheral Component Interconnect Express ('PCIe') compatible devices, the device identified by serial number '4862d81' is a SAS compatible device, and the device identified by serial number 'Egt1578uj' is a SATA compatible device. Because the nature of the device is known, the appropriate data communications protocol that is used by the new device inserted in the hard drive bay (204a, 204b, 204c, 204d) may be identified.

The fabric management module (206) of FIG. 2 may be further configured to select a fabric that supports the data communications protocol that is used by the new device. In the example of FIG. 2, selecting a fabric that supports the data communications protocol that is used by the new device may be carried out by identifying a SerDes bus (218a, 218b, 218c, 218d) that is routed to a particular hard drive bay (204a, 204b, 204c, 204d) and configured to support a data communications protocol that is used by the new device inserted in the hard drive bay (204a, 204b, 204c, 204d). As discussed above, a particular hard drive bay (204a) may include a SAS connector with two SerDes busses (218a) coupled to the connector, one of which operates as a SAS bus and another of which operates as a PCIe bus. In such an example, if the fabric management module (206) determined that a device identified by serial number 'Rt885312' is mounted within the hard drive bay (204a), the fabric management module (206) will select the particular SerDes bus (218a) that operates as a PCIe bus as the fabric that supports the data communications protocol that is used by the new device.

The fabric management module (206) of FIG. 2 may be further configured to route data communications according to the data communications protocol that is used by the new device across the selected fabric. As discussed above, a particular hard drive bay (204a) may include a SAS connector coupled to two or more SerDes busses (218a), one of which operates as a SAS bus and another of which operates as a PCIe bus. In such an example, if the fabric management module (206) determined that a device identified by serial number 'Rt885312' is mounted within the hard drive bay (204a), the fabric management module (206) will route data communications to the hard drive bay (204a) in compliance with the appropriate PCIe specification across the particular SerDes bus (218a) that operates as a PCIe bus.

In the example of FIG. 2, the fabric management module (206) is embodied as automated computing machinery that includes a processor (256) and RAM (268) that stores a fabric management module application (230) as well as on operating system (254). The fabric management module (206) may alternatively be embodied as an application-specific integrated circuit ('ASIC'), a field-programmable gate array ('FPGA'), as a multiplexor that receives a control signal from an integrated management module (214) via a control line (216), and in other ways as will occur to those of skill in the art.

The computing system (202) of FIG. 2 also includes computer system chips (224). In the example of FIG. 2, the computer system chips (224) are useful in connecting storage devices and other network devices to a host system. The computer system chips (224) may be embodied, for example, as a host controller, host adapter, or other host bus adapter useful in connecting storage devices and other network devices to a host system. In the example of FIG. 2, the computer system chips (224) are used to connect a PCIe bus (220), a SAS bus (222), a SerDes bus (226), and a USB bus (228) to the host system. These respective busses are used for data communications between the computer system chips (224) and devices mounted in the hard drive bays (204a, 204b, 204c, 204d) via the SerDes busses (218a, 218b, 218c, 218d) and the fabric management module (206) as described above.

Figure 3:
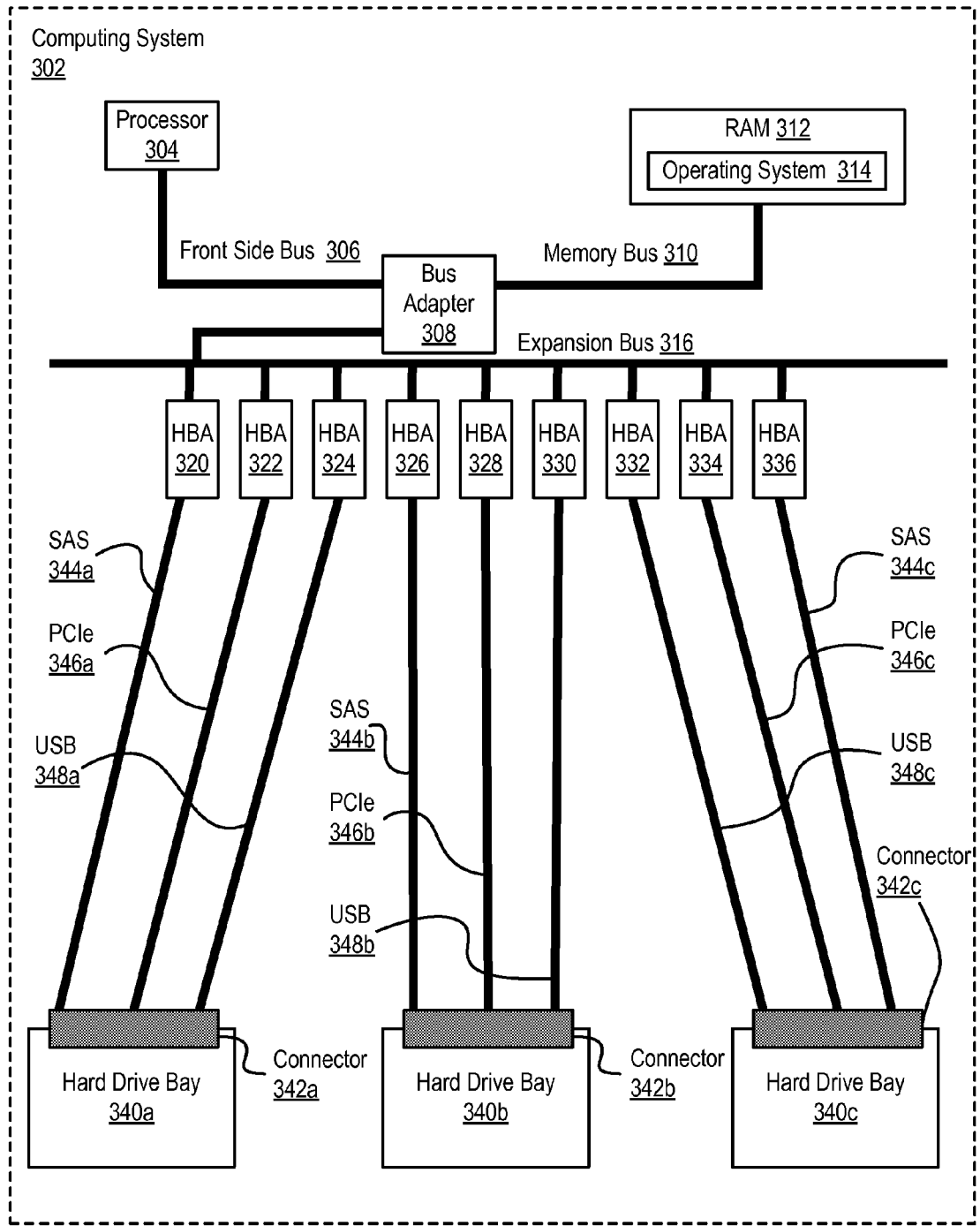
FIG. 3 sets forth a block diagram of automated computing machinery comprising an exemplary computing system useful in expanding functionality of one or more hard drive bays in the computing system according to embodiments of the present invention.

For further explanation, FIG. 3 sets forth a block diagram of automated computing machinery comprising an exemplary computing system (302) useful in expanding functionality of one or more hard drive bays (340a, 340b, 340c). The computing system (302) of FIG. 3 includes at least one processor (304) such as a CPU as well as RAM (312) which is connected through a high speed memory bus (310), a bus adapter (308), and a front side bus (306) to the processor (304). Stored in RAM (312) is an operating system (314).

Operating systems useful expanding functionality of the one or more hard drive bays (340a, 340b, 340c) in the computing system (302) according to embodiments of the present invention include UNIX™, Linux™, Microsoft XP™, AIX™, IBM's i5/OS™, and others as will occur to those of skill in the art. The operating system (314) in the example of FIG. 3 is shown in RAM (312), but many components of such software typically are stored in non-volatile memory also, such as, for example, on a disk drive.

The computing system (302) includes one or more hard drive bays (340a, 340b, 340c). In the example of FIG. 3, the hard drive bays (340a, 340b, 340c) are hot swappable in the sense that devices may be removed from or added to the hard drive bays (340a, 340b, 340c) without requiring a system reboot in order for the devices in the hard drive bays (340a, 340b, 340c) to be operable. The hard drive bays (340a, 340b, 340c) are housings configured to receive computer storage devices such as, for example, a hard drive, optical drive, or solid state drive. Examples of computer storage devices that may be mounted within the hard drive bays (340a, 340b, 340c) include a SAS hard drive, a SATA hard drive, and so on. In the example of FIG. 3, the hard drive bays (340a, 340b, 340c) may further be configured to receive computing devices other than computer storage devices as described in greater detail below.

The computing system (302) of FIG. 3 includes host bus adapters (320, 322, 324, 326, 328, 330, 332, 334, 336) coupled through an expansion bus (316) and a bus adapter (308) to the processor (304) and other components of the computing device (302). The host bus adapters (320, 322, 324, 326, 328, 330, 332, 334, 336) of FIG. 3 can connect non-volatile data storage devices mounted with the hard drive bays (340a, 340b, 340c) to the computing device (302). Host bus adapters (320, 322, 324, 326, 328, 330, 332, 334, 336) useful in expanding functionality of one or more hard drive bays (340a, 340b, 340c) according to embodiments of the present invention include SAS adapters, Integrated Drive Electronics ('IDE') adapters, SCSI adapters, SATA adapters, USB adapters, PCIe adapters, PCI adapters, Fibre Channel adapters, and others as will occur to those of skill in the art. Non-volatile computer memory also may be implemented for as an optical disk drive, electrically erasable programmable read-only memory (so-called 'EEPROM' or 'Flash' memory), RAM drives, SAS hard drives, SATA hard drives, and so on, as will occur to those of skill in the art.

In the example of FIG. 3, each hard drive bay (340a, 340b, 340c) includes a connector (342a, 342b, 342c) for coupling a device mounted within the hard drive bays (340a, 340b, 340c) to two or more data communications busses (344a, 344b, 344c, 346a, 346b, 346c, 348a, 348b, 348c) of different types. In the example of FIG. 3, each connector (342a, 342b, 342c) can couple a device mounted within the hard drive bays (340a, 340b, 340c) to a SAS bus (344a, 344b, 344c), a PCIe bus (346a, 346b, 346c), and a USB bus (348a, 348b, 348c). Although the example of FIG. 3 only illustrates connectors (342a, 342b, 342c) configured to couple a device mounted within the hard drive bays (340a, 340b, 340c) to a SAS bus (344a, 344b, 344c), a PCIe bus (346a, 346b, 346c), and a USB bus (348a, 348b, 348c), the connectors (342a, 342b, 342c) may also be configured to couple a device mounted within the hard drive bays (340a, 340b, 340c) to SerDes lanes, a PCI bus, an Inter-Integrated Circuit ('I²C') bus, a SATA bus, and any other bus as will occur to those of skill in the art. In the example of FIG. 3, each connector (342a, 342b, 342c) may be logically divided into multiple parts such that each part supports the functionality of a particular type of device such as, for example, a SAS hard drive, a PICe endpoint, and so on. In the example of FIG. 3, each connector (342a, 342b, 342c) can further include distinct breakouts for transmitting signals to each part of the connector (342a, 342b, 342c) that supports the functionality of a particular type of device.

In the example of FIG. 3, the connectors (342a, 342b, 342c) may be configured to couple a device mounted within the hard drive bays (340a, 340b, 340c) to various data communications busses (344a, 344b, 344c, 346a, 346b, 346c, 348a, 348b, 348c), for example, via USB port, a SAS connector, a PCIe slot, a PCI slot, or other or other connection apparatus for mounting a device to the hard drive bay (340a, 340b, 340c) as will occur to those of skill in the art. Because the connectors (342a, 342b, 342c) of FIG. 3 can be coupled to data communications busses of different types and because the connectors (342a, 342b, 342c) of FIG. 3 can also include multiple connection apparatuses for mounting devices of different types, the connectors (342a, 342b, 342c) of FIG. 3 can enable many different types of devices to be mounted and operate within each hard drive bay (340a, 340b, 340c).

Figure 4:
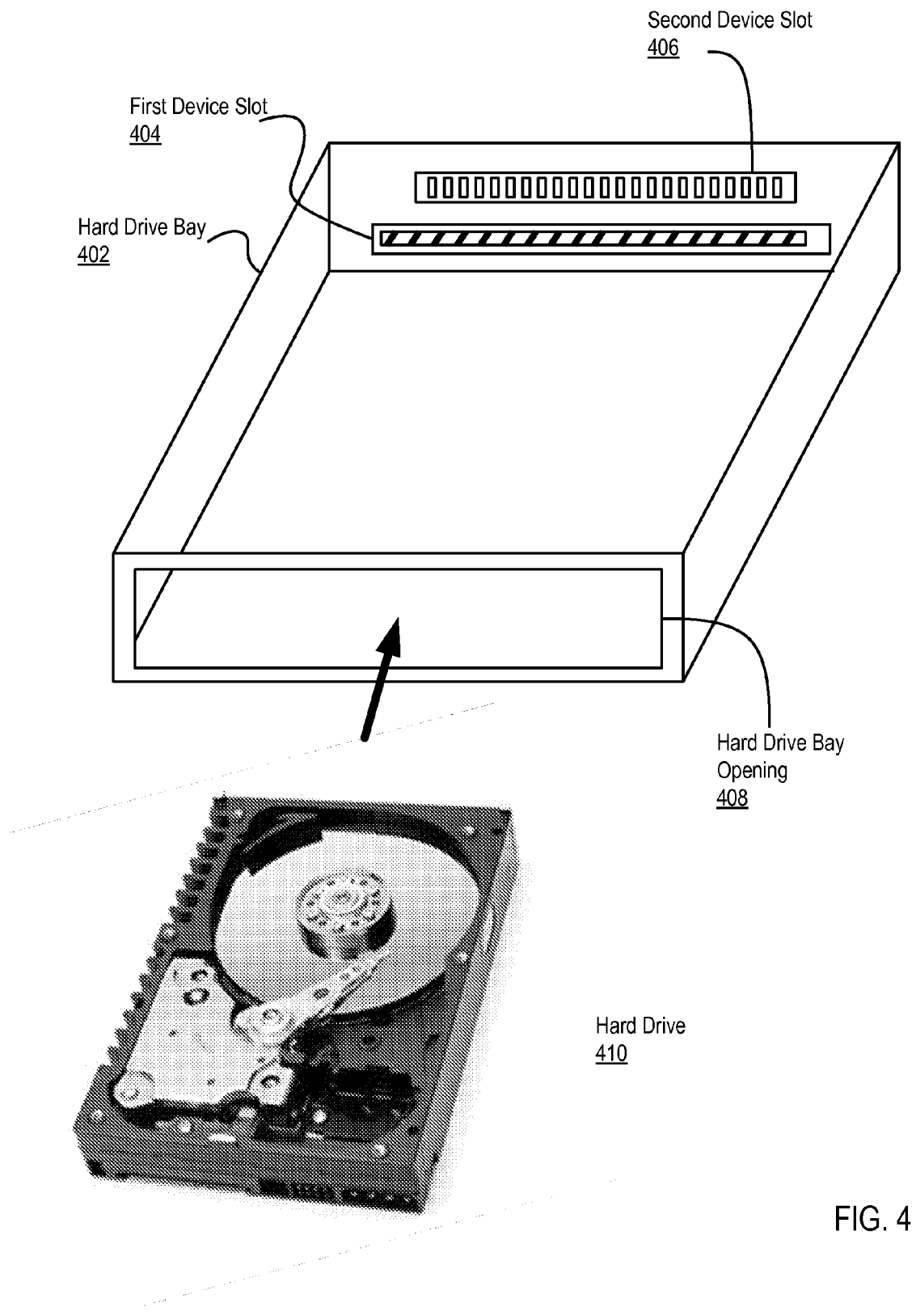
FIG. 4 sets forth a block diagram of an expanded functionality hard drive bay for use in a computing system according to embodiments of the present invention.

For further explanation, FIG. 4 sets forth a block diagram of an expanded functionality hard drive bay (402) for use in a computing system. The hard drive bay (402) is configured to couple a device, such as the hard drive (410), that is mounted within a hard drive bay (402) to one of two or more data communication busses. In the example of FIG. 4, the two or more data communication busses are of different types. Such busses may include a SAS bus, a PCIe bus, a USB bus, SerDes lanes, a PCI bus, PC bus, a Fibre Channel bus, and any other bus as will occur to those of skill in the art.

In the example of FIG. 4, the hard drive bay (402) includes a first device slot (404) and a second device slot (406) for receiving devices of different types that may be inserted via the hard drive bay opening (408). Although the hard drive bay (402) depicted in FIG. 4 includes only two device slots (404, 406), hard drive bays (402) according to embodiments of the present application may be configured to include additional device slots. In the example of FIG. 4, the device slots (404, 406) may be a USB port, a SAS connector, a PCIe slot, a PCI slot, or other connection apparatus for mounting a device within the hard drive bay (402). In the example of FIG. 4, the hard drive bay (402) can be coupled to one or more data communication busses of different types. The hard drive bay (402) may be coupled to, for example, at least two of a PCIe bus, a SAS bus, SerDes lanes, a PCI bus, an PC bus, a USB bus, a SATA bus, and others as will occur to those of skill in the art.

Figure 5:
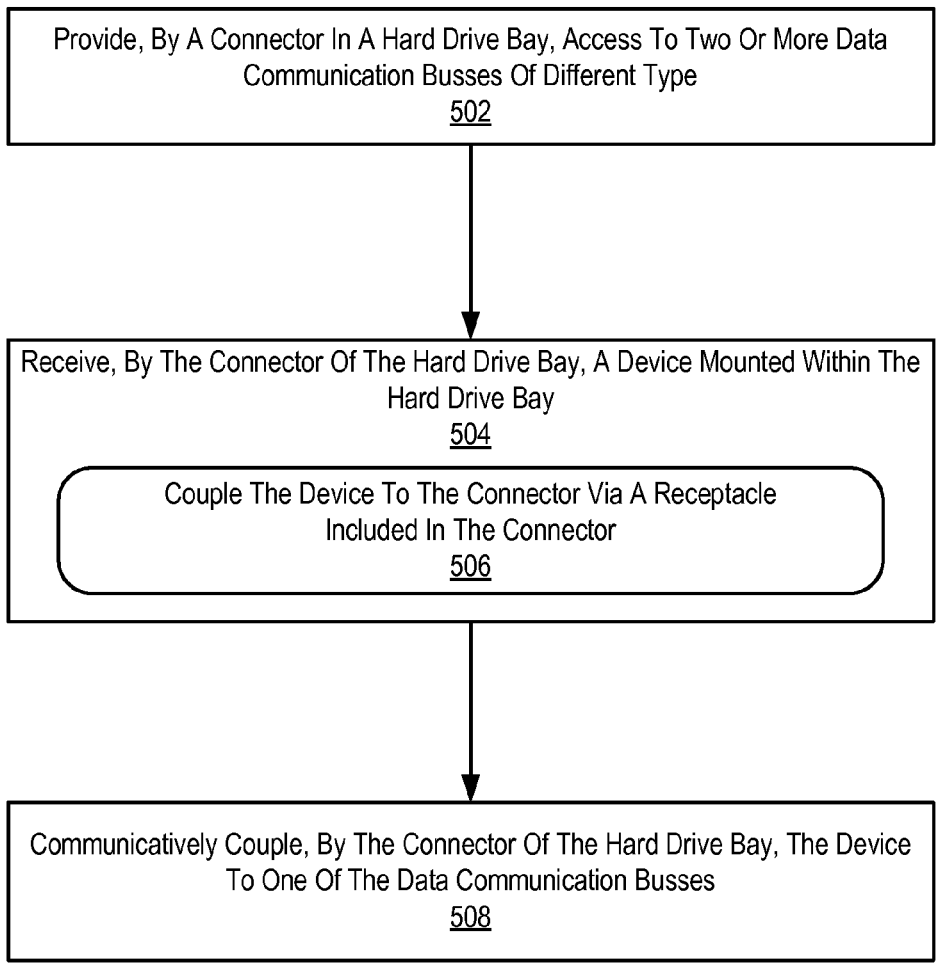
FIG. 5 sets forth a flow chart illustrating an exemplary method for expanding functionality of one or more hard drive bays in a computing system according to embodiments of the present invention.

For further explanation, FIG. 5 sets forth a flow chart illustrating an exemplary method for expanding functionality of one or more hard drive bays in a computing system according to embodiments of the present invention. The example of FIG. 5 includes providing (502), by a connector in a hard drive bay, access to two or more data communication busses of different types. Providing (502) access to two or more data communication busses of different types may be carried out, for example, by physically connecting the two or more data communication busses of different types to the connector.

The example of FIG. 5 also includes receiving (504), by the connector of the hard drive bay, a device mounted within the hard drive bay. In the example of FIG. 5, receiving (504) a device mounted within the hard drive bay may include coupling (506) the device to the connector via a receptacle included in the connector. Coupling (506) the device to the connector via a receptacle included in the connector may include mounting a device of a particular type to a connector that supports devices of the particular type, for example, by mounting a SAS hard drive on a SAS connector that is included in the hard drive bay, such as an SFF-8482 connector or an SFF-8484 connector.

The method of FIG. 5 also includes communicatively coupling (508), by the connector of the hard drive bay, the device to one of the data communication busses. In the example of FIG. 5, the device is communicatively coupled to one of the data communication busses via a physical connection facilitated by the connector. The connector is used to establish a physical connection between a device of a particular type, such as a SAS bus, with a receptacle for a particular device type, such as a SAS connector.

Exemplary embodiments of the present invention are described largely in the context of a fully functional computer system for expanding functionality of one or more hard drive bays in a computing system. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of expanding functionality of one or more hard drive bays in a computing system, the method comprising:
    providing, by a connector in a hard drive bay, access to two or more data communication busses of different type;
    receiving, by the connector of the hard drive bay, a device mounted within the hard drive bay; and
    communicatively coupling, by the connector of the hard drive bay, the device to one of the data communication busses.

2. The method of claim 1 wherein receiving a device mounted within the hard drive bay further comprises coupling the device to the connector via a receptacle included in the connector.

3. The method of claim 2 wherein the receptacle included in the connector is a Universal Serial Bus ('USB') port.

4. The method of claim 2 wherein the receptacle included in the connector is a Serial Attached SCSI ('SAS') connector.

5. The method of claim 2 wherein the receptacle included in the connector is a Peripheral Component Interconnect Express ('PCIe') slot.

6. The method of claim 1 wherein the hard drive bay is hot swappable.

7. Apparatus with expanded hard drive bay functionality, the apparatus comprising a computer processor, a computer memory operatively coupled to the computer processor, the apparatus further comprising:
    two or more data communication busses, wherein each data communication bus of the two or more data communication busses are of a different type;
    a hard drive bay; and
    a connector coupled to each of the two or more data communication busses, wherein the connector is configured to receive a device mounted within the hard drive bay and further configured to couple the device mounted within the hard drive bay to one of the two or more data communication busses.

8. The apparatus of claim 7, wherein the two or more data communication busses include at least two of: a Peripheral Component Interconnect Express ('PCIe') bus, a Serial Attached SCSI ('SAS') bus, Serializer/Deserializer ('SerDes') lanes, a Peripheral Component Interconnect ('PCI') bus, an Inter-Integrated Circuit ('I²C') bus, a Universal Serial Bus ('USB'), and a Serial ATA ('SATA') bus.

9. The apparatus of claim 7, wherein the connector is configured to receive a device mounted within the hard drive bay via a USB port, a SAS connector, a PCIe slot, or a PCI slot.

10. The apparatus of claim 7, wherein the hard drive bay is hot swappable.

11. An expanded functionality hard drive bay for use in a computing system, the hard drive bay configured to couple a device mounted within the hard drive bay to one of two or more data communication busses via a connector coupled to each of the or more data busses, wherein each of the two or more data busses are of a different type.

12. The hard drive bay of claim 11, wherein the hard drive bay includes at least two of a Universal Serial Bus ('USB') port, a Serial Attached SCSI ('SAS') connector, a Peripheral Component Interconnect Express ('PCIe') slot, or a Peripheral Component Interconnect ('PCI') slot.

13. The hard drive bay of claim 11, wherein the hard drive bay is configured to be coupled to at least two of: a PCIe bus, a SAS bus, Serializer/Deserializer ('SerDes') lanes, a PCI bus, an Inter-Integrated Circuit ('I²C') bus, a USB bus, and a Serial ATA ('SATA') bus.

14. A computer program product for expanding functionality of one or more hard drive bays in a computing system, the computer program product disposed upon a computer readable storage medium, the computer program product comprising computer program instructions for:
    providing, by a connector in a hard drive bay, access to two or more data communication busses of different type;
    receiving, by the connector of the hard drive bay, a device mounted within the hard drive bay; and
    communicatively coupling, by the connector of the hard drive bay, the device to one of the data communication busses.

15. The computer program product of claim 14, wherein the computer program instructions for receiving a device mounted within the hard drive bay include computer program instructions for coupling the device to the connector via a receptacle included in the connector.

* * * * *